United States Patent [19]

Imai et al.

[11] Patent Number: 5,082,908

[45] Date of Patent: Jan. 21, 1992

[54] ETHYLENE-α-OLEFIN COPOLYMER AND PROCESS FOR PRODUCING THE SAME

[75] Inventors: Akio Imai; Kiyoyuki Sugimori; Keisaku Yamamoto; Minoru Takane, all of Chiba, Japan

[73] Assignee: Sumitomo Chemical Co., Ltd., Osaka, Japan

[21] Appl. No.: 363,654

[22] Filed: Jun. 8, 1989

[30] Foreign Application Priority Data

Jun. 8, 1988 [JP] Japan .................. 63-142522
Jun. 1, 1989 [JP] Japan .................. 1-141854

[51] Int. Cl.$^5$ .................. C08F 4/609; C08F 210/16
[52] U.S. Cl. .................. 526/143; 526/169.2; 526/348; 526/348.6
[58] Field of Search .................. 526/143, 348, 348.6

[56] References Cited

U.S. PATENT DOCUMENTS

| | | | |
|---|---|---|---|
| 3,301,834 | 1/1967 | Christman | 526/143 |
| 3,600,368 | 8/1971 | Schaum et al. | 526/143 |
| 3,622,548 | 11/1971 | Emde et al. | 526/143 |
| 3,645,992 | 2/1972 | Elston | 526/169.2 |

FOREIGN PATENT DOCUMENTS

| | | | |
|---|---|---|---|
| 2532115 | 2/1977 | Fed. Rep. of Germany | 526/143 |
| 46-21212 | 6/1971 | Japan . | |
| 47-26185 | 7/1972 | Japan . | |
| 55-24447 | 6/1980 | Japan . | |
| 63-17912 | 1/1988 | Japan . | |
| 1403372 | 8/1975 | United Kingdom . | |
| 2093047 | 8/1982 | United Kingdom . | |

OTHER PUBLICATIONS

Patent Abstracts of Japan, vol. 12, No. 223 (C-507)[3070], 24th Jun. 1988; & JP-A-63 20 309 (Japan Synthetic Rubber Co., Ltd.) 28-01-1988.

*Primary Examiner*—Edward J. Smith
*Attorney, Agent, or Firm*—Sughrue, Mion, Zinn, Macpeak & Seas

[57] ABSTRACT

An ethylene-α-olefin copolymer is disclosed, which comprises ethylene and an α-olefin having from 3 to 10 carbon atoms, has an ethylene/α-olefin molar ratio of from 88/12 to 98/2, and which has a number average molecular weight of from 35,000 to 80,000 and a weight average molecular weight/number average molecular weight ratio of from 1.8/1 to 3.0/1 as determined by gel permeation chromatography. A process for producing the ethylene-α-olefin copolymer is also disclosed. The ethylene-α-olefin copolymer exhibits excellent transparency and excellent low-temperature heat-sealing properties. The process is advantageous from the standpoint of equipment, energy and cost.

5 Claims, No Drawings

ETHYLENE-α-OLEFIN COPOLYMER AND PROCESS FOR PRODUCING THE SAME

FIELD OF THE INVENTION

This invention relates to an ethylene-α-olefin copolymer and a process for producing the same. More particularly, it relates to an ethylene-α-olefin copolymer excellent in transparency and low-temperature heat-sealing properties and to a process for producing such an ethylene-α-olefin copolymer.

BACKGROUND OF THE INVENTION

Ethylene-α-olefin copolymers exhibit excellent characteristics such as heat resistance, weather resistance and ozone resistance and have therefore found broad applications as automobile materials, construction materials, industrial materials and resin modifiers. In particular, ethylene-α-olefin copolymers having a high ethylene content are soft resins having properties midway between rubbers and crystalline plastics and are now in growing demand as packaging film, etc. Inter alia, copolymers obtained by copolymerizing ethylene and an α-olefin in the presence of a titanium-based polymerization catalyst are known as linear low-density polyethylene (hereinafter abbreviated as LLDPE) and are widely employed. However, films produced from LLDPE do not always satisfy requirements of low-temperature heat-sealing properties and transparency. The insufficient transparency or heat-sealing properties of the LLDPE are considered attributed to non-uniform composition of ethylene and α-olefin in the copolymer and broad molecular weight distribution.

On the other hand, several processes for producing ethylene-α-olefin copolymers using a vanadium-based catalyst have been proposed. For example, JP-B-46-21212 (the term "JP-B" as used herein means an "examined published Japanese patent application") discloses a process of solution polymerization of ethylene and an α-olefin using a catalyst system comprised of a vanadium compound and an organoaluminum compound. According to this process, a copolymer is obtained in the form of a uniform solution, i.e., as dissolved in a polymerization solvent. However, the vanadium compound used greatly declines in catalytic activity as the polymerization temperature increases. For example, as shown in the working examples of this patent publication, the polymerization activity becomes too low to be suited for practical use in a high temperature range, e.g., at 100° C, only to produce a copolymer having broad molecular weight distribution and having a high solvent extractable content. JP-B-47-26185 discloses a process for producing an ethylene-α-olefin copolymer by using a halogenated lower aliphatic hydrocarbon or a hydrocarbon having from 3 to 5 carbon atoms as a polymerization solvent and a combination of a VOX3 compound and an organoaluminum compound as a catalyst system. Polymerization in a halogenated hydrocarbon produces a polymer as a precipitate insoluble in the polymerization solvent, forming a slurry having a low viscosity as a whole. This is economically advantageous in stirring or transporting the system but, in turn, there are problems arising from decomposition of the halogenated hydrocarbon, such as corrosion of apparatus and storage stability of the polymer. In the case of slurry polymerization in a hydrocarbon solvent having 3 to 5 carbon atoms, closeness of the boiling point of this solvent to that of the ethylene-copolymerizable α-olefin, particularly propylene or 1-butene, gives rise to a great problem in separating the unreacted monomer and the polymerization solvent in the purification step. Further, from an economical viewpoint, this process is not always recognized advantageous since hydrocarbons having 3 to 5 carbon atoms have low boiling points and therefore require a freezing apparatus for liquefication and a pressure-resistant apparatus as well as a cooling medium. Furthermore, the process requires large-sized equipment for an ashing step for removing the catalyst components incorporated into the produced polymer particles.

JP-B-55-24447 discloses a process for producing an ethylene-1-butene copolymer having an ethylene content of from 85 to 95 mol %, in which copolymerization is effected at a temperature of from −20° to 30° C. in an aliphatic hydrocarbon having from 6 to 15 carbon atoms as a polymerization solvent in the presence of a catalyst system composed of a soluble vanadium compound and an organoaluminum halide. Similarly, JP-A-63-17912 (the term "JP-A" as used herein means an "unexamined published Japanese patent application") describes a process for copolymerizing ethylene and an α-olefin at from −20° to 30° C. using a catalyst system composed of a soluble vanadium compound and a chlorinated organoaluminum compound. Both of these processes relate to slurry polymerization with a difference lying in that the Al/V atomic molar ratio is from 2/1 to 50/1 in the former process and from 55/1 to 170/1 in the latter process. According to either process, since polymerization is carried out at a relatively low temperature (from −20° to 30° C.), a large quantity of a cooling medium and an energy for driving a freezing device are necessary. In addition, the reaction rate attained is so low that the retention time in the reaction vessel becomes long, increasing the overall volume of the reaction vessel, which results in large consumption of stirring power in the reaction vessel.

In short, when ethylene-α-olefin copolymers having a high ethylene content are produced by slurry polymerization, that is, in a system in which a part of the copolymer produced is insoluble in a polymerization solvent so that the reaction proceeds while the insoluble copolymer being in a precipitated state, by the conventional processes, it is necessary to make a proper choice of a solvent, and the reaction should be conducted at low temperatures, which is disadvantageous from the standpoint of equipment and energy. On the other hand, in the case of solution polymerization in a system in which copolymerization proceeds while the whole copolymer being dissolved in the solvent, the conventional processes require relatively high temperatures and suffer from reduction of catalyst efficiency, resulting in economical disadvantage.

From all these considerations, it has been keenly demanded to develop a slurry polymerization technique which can be effected at a moderate temperature, more specifically at around 40 to 65° C. at which a vanadium-based catalyst exerts the possible highest activity, which wold be of advantage from the standpoint of equipment, energy, and cost. The most relevant process so far proposed in this connection is found, e.g., in JP-B-46-11028. According to the disclosed technique, however, the resulting copolymer has a largely non-uniform composition and a broad molecular weight distribution, thereby possessing poor strength and poor transparency.

SUMMARY OF THE INVENTION

One object of this inveniton is to eliminate the disadvantages associated with the conventional processes and to provide a process for producing an ethylene-α-olefin copolymer having a narrow molecular weight distriubtioon and a uniform composition by slurry polymerization with industrial advantages from the standpoint of equipment, energy, and cost.

Another object of this invention is to provide an ethylene-α-olefin copolymer having a narrow molecular weight distribution, a uniform composition, and a low solvent extractable content, thereby exhibiting satisfactory transparency and excellent low-temperature heat-sealing properties.

The inventors have conducted extensive investigations on a process for producing an ethyelene-α-olefin copolymer having a narrow molecular weight distribution and a uniform composition. As a result, it has now been found that slurry polymerization can be carried out at a low viscosity by using a threecomponent catalyst system comprising a specific vanadium compound, a specific organoaluminum compound and a specific halogenated ester compound at a specific mixing ratio and by properly selecting a copolymerization temperature, a molar ratio of ethylene and an α-olefin, and a copolymerization solvent to be used. It has also been found that an ethylene-α-olefin copolymer having the above-described properties can be obtained by slightly elevating the temperature of the system after completion of the copolymerization thereby making it possible to handle the reaction system as a uniform solution and facilitating ashing of the copolymer. The present invention has been completed based on these findings.

That is, in one embodiment the present invention provides an ethylene-α-olefin copolymer which comprises ethylene and an α-olefin having from 3 to 10 carbon atoms, has an ethylene/α-olefin molar ratio of from 88/12 to 98/2, and which has a number average molecular weight of from 35,000 to 80,000 and a weight average molecular weight/number average molecular weight ratio of from 1.8/1 to 3.0/1 as determined by gel permeation chromatography (GPC).

Further, in another embodiment the present invention provides a process for producing an ethylene-α-olefin copolymer having an ethylene/α-olefin molar ratio of from 88/12 to 98/2 and having a number average molecular weight of from 35,000 to 80,000 and a weight average molecular weight/number average molecular ratio of from 1.8/1 to 3.0/1 as determined by GPC, which comprises copolymerizing ethylene and an α-olefin having from 3 to 10 carbon atoms at an ethylene/α-olefin molar ratio of from 35/65 to 60/40 and at a temperature of from 40 to 80° C. using a catalyst system composed of a vanadium compound represented by formula:

$$VO(OR)_nX_{3-n}$$

Wherein R represents a hydrocarbon group; X represents a halogen atom; and n is a number of from 0 to 3, an organoaluminum compound represented by formula:

$$R'_mAlX_{3-m}$$

wherein R' represents a hydrocarbon group; X represents a halogen atom; and m represents a number of from 1 to 3, and a halogenated ester compound represented by formula:

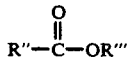

wherein R" represents an organic group derived from a hydrocarbon group having from 1 to 20 carbon atoms by substituting a part or all of the hydrogen atoms thereof with a halogen atom; and R''' represents a hydrocarbon group having from 1 to 20 carbon atoms, at an organoaluminum compound/vanadium compound molar ratio of 2.5/1 or more and at a halogenated ester compound/vanadium compound molar ratio of 1.5/1 or more, in a system in which a polymer insoluble in a hydrocarbon solvent and a polymer soluble in a hydrocarbon solvent coexist.

The process of the present invention is characterized in that the copolymerization is carried out in a system where a hydrocarbon solvent-soluble polymer and a hydrocarbon solvent-insoluble polymer coexist, more specifically, in a mixed system comprising a dissolved state polymer and insoluble fine polymer particles having a particle size of not more than 0.5 mm. Such a mixed polymerization system, when set at 40° C, contains 95% by weight or more of the hydrocarbon solvent-insoluble polymer based on the total polymer. In this case, the system has a low viscosity characteristic of a slurry polymerization system. When the system is set at 70° C or higher, the system becomes a uniform solution.

DETAILED DESCRIPTION OF THE INVENTION

Important in the present invention are choices of a combination of catalyst components, a copolymerization solvent, and a copolymerization temperature.

Specific examples of the vanadium compound represented by formula $VO(OR)_nX_{3-n}$, wherein R, X, and n are as defined above, include $VOCl_3$, $VO(OCH_3)Cl_2$, $VO(OCH_3)_2Cl$, $VO(OCH_3)_3$, $VO(OC_2H_5)Cl_2$, $VO(OC_2H_5)_2Cl$, $VO(OC_2H_5)_3$, $VO(OC_3H_7)Cl_2$, $VO(OC_3H_7)_2Cl$, $VO(OC_3H_7)_3$, $VO(O\text{-iso-}C_3H_7)Cl_2$, $VO(O\text{-iso-}C_3H_7)_2Cl$, $VO(O\text{-iso-}C_3H_7)_3$, and mixtures thereof. These vanadium compounds except for $VOCl_3$ can easily be prepared by reacting $VOCl_3$ with an alcohol or by reacting $VOCl_3$ with $VO(OR)_3$. Preferred of them are those wherein $0 \leq n \leq 1$, i.e., $VOCl_3$, $VO(OCH_3)Cl_2$, $VO(OC_2H_5)Cl_2$, $VO(OC_3H_7)Cl_2$, and $VO(O\text{-iso-}C_3H_7)Cl_2$, from the viewpoint of obtaining copolymers having a narrow molecular weight distribution and a uniform composition. In particular, $VOCl_3$ (n=0) is the most preferred.

The copolymerization system in the co-presence of a hydrocarbon solvent-insoluble polymer and a hydrocarbon solvent-soluble polymer may also be achieved by the use of the vanadium compounds wherein $1 \leq n \leq 3$, e.g., $VO(OCH_3)_2Cl$, $VO(OCH_3)_3$, $VO(OC_2H_5)_2Cl$, $VO(OC_2H_5)_3$, $VO(OC_3H_7)_2Cl$, $VO(OC_3H_7)_3$, $VO(O\text{-iso-}C_3H_7)_2Cl$, and $VO(O\text{-iso }C_3H_7)_3$. However, the ethylene-α-olefin copolymers obtained from such a system have two endothermic peaks in differential thermal analysis (DTA) by means of a differential scanning calorimeter (DSC), one in the region -between 80° C and 105° C and the other in the region exceeding 105° C. Some of such copolymers may suffer from reduction of heat-sealing properties or transparency.

The organoaluminum compound represented by formula $R'_m AlX_{3-m}$, wherein R', X, and m are as defined above, which can be used in the catalyst system includes $(C_2H_5)_2AlCl$, $(C_4H_9)_2AlCl$, $(C_6H_{13})_2AlCl$, $(C_2H_5)_{1.5}AlCl_{1.5}$, $(C_4H_9)_{1.5}AlCl_{1.5}$, $(C_6H_{13})_{1.5}AlCl_{1.5}$, $C_2H_5AlCl_2$, $C_4H_9AlCl_2$, and $C_6H_{13}AlCl_2$. From the standpoint of reaction rate and yield, preferred of them are those wherein $1 \leq m \leq 2$, with $(C_2H_5)_{1.5}AlCl_{1.5}$ being more preferred.

The halogenated ester compound represented by formula

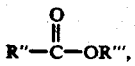

wherein R'' and R''', are as defined above, which can be used as a catalyst component preferably includes those wherein R'' is a group in which all the hydrogen atoms thereof are substituted with a halogen atom, more preferably perchlorocrotonic acid esters. Specific examples of the halogenated ester compound are ethyl dichloroacetate, methyl trichloroacetate, ethyl trichloroacetate, methyl dichlorophenylacetate, ethyl dichlorophenylacetate, methyl perchlorocrotonate, ethyl perchlorocrotonate, propyl perchlorocrotonate, isopropyl perchlorocrotonate, butyl perchlorocrotonate, cyclopropyl perchlorocrotonate, and phenyl perchlorocrotonate.

In the copolymerization system, the vanadium compound concentration ranges from 0.00005 mmol/l to 5 mmols/l, preferably from 0.0001 mmol/l to 1 mmol/l. The molar ratio of the organoaluminum compound to the vanadium compound should be 2.5/1 or more, preferably from 2.5/1 to 30/1, and the molar ratio of the halogenated ester compound to the vanadium compound should be 1.5/1 or more. If the organoaluminum compound/vanadium compound molar ratio is less than 2.5/1, the copolymerization reaction becomes extremely unstable, resulting in stopping or failing to obtain a desired copolymer having a narrow molecular weight distribution. If the halogenated ester compound/ vanadium compound molar ratio is less than 1.5/1, the resulting copolymer has a broad molecular weight distribution.

The copolymerization according to the present invention is carried out in a hydrocarbon solvent. The hydrocarbon solvent to be used includes aliphatic hydrocarbons, e.g., hexane, heptane, octane, decane, dodecane, and kerosine; alicyclic hydrocarbons, e.g., cyclohexane, methylcyclopentane, and methylcyclohexane; and aromatic- hydrocarbons, e.g., benzene, toluene, and xylene. Preferred of them are hexane, heptane, octane, and cyclohexane. The solvent may be partly or wholly replaced with an α-olefin, e.g., propylene, 1-butene, 1-pentene, and 1-hexene.

The copolymerization temperature ranges from 40 to 80° C, preferably from 40 to 65° C. If it is lower than 40° C, the reaction rate is seriously reduced and, in addition, specific cooling or freezing equipment would be necessary to remove the reaction heat. On the other hand, at temperatures higher than 80° C, the whole copolymer produced becomes soluble in the solvent throughout the copolymerization system to increase the viscosity of the system, thus so much increasing the power required for stirring and mixing. At even higher temperatures, the polymerization activity of the catalyst is lost, failing to produce a copolymer.

The copolymerization is carried out under atmospheric pressure or under an elevated pressure, preferably at a pressure of from 1 to 30 kg/cm², more preferably from 1 to 20 kg/cm².

The retention time of the copolymerization reaction mixture in the copolymerization vessel ranges from 10 to 180 minutes, preferably from 20 to 120 minutes, on average. In order to assure good reproducibility in obtaining an ethylene-α-olefin copolymer with satisfactory physical properties, the total polymer concentration in the copolymerization system is adjusted not to exceed 15% by weight, preferably not to exceed 12% by weight.

The copolymerization is effected in system where a hydrocarbon solvent-insoluble polymer and a hydrocarbon solvent-soluble polymer coexist while stirring. It is preferable to control the molar ratio of ethylene and α-olefin to be charged in such a manner that the hydrocarbon solvent-insoluble polymer content may amount to 95% by weight or more at 40° C or the total polymer may solely comprise the hydrocarbon solvent-soluble polymer at 70° C. In such a copolymerization system, the copolymerization temperature is preferably set at from 40 to 65° C, more preferably at from 40 to 55° C. In this particular system, since the reaction proceeds with the hydrocarbon solvent-insoluble polymer being suspended in the form of fine particles of 0.5 mm or smaller in diameter, the viscosity of the system can be kept low, the stirring power energy can be minimized, and the reaction heat can easily be removed. Moreover, a satisfactory mixing state of the catalyst and the monomers can be obtained, as is advantageous for obtaining a polymer having a narrow molecular weight distribution and a uniform composition. The temperature in the downstream side of the reaction vessel, on the other hand, is controlled at 70° C or higher, whereby the total polymer in this side becomes soluble in the solvent. Such temperature control can thus eliminate the problem due to precipitated polymer particles generally encountered in slurry polymerization systems effected on an industrial scale, i.e., sedimentation and deposition of the polymer particles in areas of insufficient flow in the plant or obstruction of piping.

The weight ratio of the hydrocarbon solventinsoluble polymer and the hydrocarbon solvent-soluble polymer can be determined by filtering the reaction mixture sampled from the copolymerization system through a metallic net of 300 mesh to separate the hydrocarbon solvent-soluble matter and hydrocarbon solvent-insoluble matter, removing the hydrocarbon solvent from each matter by drying, and weighing each of the resulting solids.

The ethylene-α-olefin copolymer according to the present invention has an ethylene/α-olefin molar ratio of from 88/12 to 98/2 and a ratio of weight average molecular weight ($\overline{M}w$) to number average molecular weight ($\overline{M}n$), $\overline{M}w/\overline{M}n$ (hereinafter referred to as a Q value), of from 1.8/1 to 3.0/1 as determined by GPC. The ethylene-α-olefin copolymer satisfying these conditions exhibits excellent performance properties in terms of strength at break, elongation, and surface hardness as measured according to JIS K-6301. Preferred ethylene-α-olefin copolymers which are particularly excellent in heat-sealing properties and transparency have an ethylene/α-olefin molar ratio of from 92/8 to 96/4 and a Q value of from 1.8/1 to 2.6/1, and shows only one endothermic peak as determined with DSC, said peak being between 80° C and 105° C.

The ethylene-α-olefin copolymer according to the present invention has a number average molecular weight of from 35,000 to 80,000 as determined by GPC. If it is less than 35,000, the copolymer produced has an insufficient strength. On the other hand, if it exceeds 80,000, the molding processability is poor.

GPC as used herein was conducted under the following measurement conditions:

GP Chromatograph: 150 C Model, manufactured by Waters Corp.
Column: Shodex ® AC-80M, manufactured by Shoda Denko K.K.
Sample Volume: 300 μl (polymer conc.: 0.2% by weight)
Flow Rate: 1 ml/min
Temp.: 135° C.
Solvent: 1,2,4-trichlorobenzene A calibration curve was prepared in a usual manner by using a standard polystyrene produced by Tosoh Corporation. Data were processed by the use of Data Processor CP-8 Model III, manufactured by Tosoh Corporation.

Molecular weight control of the ethylene/α-olefin copolymer can be done with H2, diethylamine, allyl chloride, pyridine-N-oxide, etc., with $H_2$ being particularly preferred.

The present invention is now illustrated in greater detail by way of the following Examples, Comparative Examples, Reference Examples, and Comparative Reference Examples, but it should be understood that the present invention is not deemed to be limited thereto.

EXAMPLE 1

Ethylene and 1-butene were continuously copolymerized by using a 5 l-volume SUS-made polymerization vessel equipped with a stirring blade.

Hexane as a polymerization solvent was continuously fed into the lower part of the vessel at a rate of 5 l/hr., while a polymerization mixture was continuously withdrawn from the upper part of the vessel so as to maintain the volume of the polymerization mixture in the vessel at 5 l. As a catalyst system, vanadium oxytrichloride, ethylaluminum sesquichloride, and n-butyl perchlorocrotonate were continuously fed to the upper part of the vessel at a rate of 0.050 mmol/hr, 1.2 mmols/hr, and 0.12 mmol/hr, respectively. Ethylene and 1-butene as monomers were continuously fed to the lower part of the vessel at a feed rate of 230 g/hr and 360 g/hr, respectively. Molecular weight control was effected with hydrogen. The copolymerization temperature was controlled at 55° C by circulating cooling water through a jacket provided around the vessel.

The copolymerization reaction was carried out under the above-recited conditions to thereby produce an ethylene-1-butene copolymer in the form of a mixture of a polymerization solvent-insoluble matter and a polymerization solvent-soluble matter. A small amount of methanol was added to the polymerization mixture withdrawn from the reaction vessel to stop the reaction. Any unreacted monomers were removed from the mixture, the mixture was washed with water, and the solvent was removed by stripping with steam in a large quantity of water. The collected copolymer was dried at 80° C under reduced pressure for one day. There was thus obtained an ethylene-1-butene copolymer at an output rate of 170 g/hr.

The ethylene content of the resulting copolymer was found to be 96.1 mol% by infrared absorption analysis. GPS analysis revealed that the copolymer had an $\overline{Mw}$ of 112,000 and an Mn of 55,000, giving a Q value of 2.2/1. The DTA curve of the copolymer obtained by the use of DSC had a single fusion peak, showing a melting point (Tm) at 99° C and a heat of fusion (ΔHm) of 19 cal/g.

The polymerization mixture withdrawn from the reaction vessel was filtered through a metallic net of 300 mesh to separate the solvent-insoluble matter and solvent-soluble matter, and each of them was weighed to give an insoluble matter/soluble matter weight ratio of 61/39.

When the copolymer was press molded, the resulting molded article exhibited highly satisfactory transparency and had a strength at break of 330 kgf/cm$^2$, an elongation at break of 710%, and a surface hardness of 93, each measured in accordance with JIS K-6301.

EXAMPLES 2 TO 5

Ethylene and 1-butene were copolymerized in the same manner as in Example 1, except for altering the conditions as shown in Table 1. Each of the resulting copolymers was analyzed and evaluated in the same manner as in Example 1, and the results obtained are shown in Table 2.

EXAMPLES 6 AND 7

Copolymerization was carried out in the same manner as in Example 1, except for replacing 1-butene with propylene and altering the polymerization conditions as shown in Table 1. Each of the resulting ethylene-α-olefin copolymers was analyzed and evaluated in the same manner as in Example 1, and the results obtained are shown in Table 2.

COMPARATIVE EXAMPLES 1 AND 2

Copolymerization was carried out in the same manner as in Example 1, except for using, as catalyst components, vanadium oxytrichloride and ethylaluminum sesquichloride only but using no n-butyl perchlorocrotonate and altering the reaction conditions as shown in Table 1. Each of the resulting copolymers was analyzed and evaluated in the same manner as in Example 1, and the results obtained are shown in Table 2.

TABLE 1

| Example No. | Feed Rate of Solvent (l/hr) | Feed Rate of Catalyst Component | | | Feed Rate of Monomer | | | Polymn. Temp. (°C.) | Output Rate of Copolymer (g/hr) | Solvent-Insoluble/ Solvent-Soluble Copolymer Weight Ratio |
| | | Vanadium Compound (mmol/hr) | Organo-aluminum Compound (mmol/hr) | Halogenated Ester Compound (mmol/hr) | Ethylene (g/hr) | α-Olefin (g/hr) | Ethylene/ α-Olefin Molar Ratio | | | |
| --- | --- | --- | --- | --- | --- | --- | --- | --- | --- | --- |
| Example 1 | 5.0 | 0.050 | 1.2 | 0.12 | 230 | 360 | 56/44 | 55 | 170 | 61/39 |
| Example 2 | " | 0.081 | 1.1 | 0.22 | 220 | " | 55/45 | 50 | 150 | 44/56 |
| Example 3 | " | 0.12 | 1.7 | 0.33 | 200 | 395 | 50/50 | " | 155 | 13/87 |
| Example 4 | 4.3 | " | " | " | 175 | " | 47/53 | 40 | 170 | 4/96 |

TABLE 1-continued

| Example No. | Feed Rate of Solvent (l/hr) | Feed Rate of Catalyst Component | | | Feed Rate of Monomer | | | Polymn. Temp. (°C.) | Output Rate of Copolymer (g/hr) | Solvent-Insoluble/ Solvent-Soluble Copolymer Weight Ratio |
| --- | --- | --- | --- | --- | --- | --- | --- | --- | --- | --- |
| | | Vanadium Compound (mmol/hr) | Organo-aluminum Compound (mmol/hr) | Halogenated Ester Compound (mmol/hr) | Ethylene (g/hr) | α-Olefin (g/hr) | Ethylene/α-Olefin Molar Ratio | | | |
| Example 5 | " | 0.14 | 1.9 | 0.38 | 165 | " | 46/54 | " | 165 | 2/98 |
| Comparative Example 1 | 3.8 | 0.58 | 4.0 | — | 180 | " | 48/52 | " | 180 | 8/92 |
| Example 6 | 5.0 | 0.075 | 1.1 | 0.21 | 250 | 375 | 50/50 | 55 | 230 | 10/90 |
| Example 7 | " | 0.092 | 1.3 | 0.25 | " | 425 | 47/53 | 50 | 220 | 2/98 |
| Comparative Example 2 | 4.5 | 0.35 | 2.4 | — | " | 400 | 55/45 | " | 225 | 6/94 |

TABLE 2

| Example No. | Ethylene/α-Olefin Molar Ratio in Copolymer | GPC | | | DSC | | | Trans-parency | Mechanical Properties | | Surface Hardness |
| --- | --- | --- | --- | --- | --- | --- | --- | --- | --- | --- | --- |
| | | Mn | Mw | Q | Peak Shape | Tm (°C.) | ΔHm (cal/g) | | Strength at Break (kgf/cm$^2$) | Elongation at Break (%) | |
| Example 1 | 96.1/3.9 | 55000 | 112000 | 2.0/1 | single | 99 | 19 | good | 330 | 710 | 93 |
| Example 2 | 94.5/5.5 | 59000 | 118000 | " | " | 86 | 13 | " | 350 | 730 | 91 |
| Example 3 | 92.2/7.8 | 62000 | 131000 | 2.1/1 | " | 75 | 7.6 | " | 330 | 670 | 86 |
| Example 4 | 89.5/10.5 | 40000 | 88000 | 2.2/1 | " | 66 | 3.7 | " | 220 | 990 | 77 |
| Example 5 | 88.6/11.4 | 61000 | 130000 | 2.1/1 | " | 57 | 2.1 | " | 200 | 760 | 71 |
| Comparative Example 1 | 89.7/10.3 | 33000 | 106000 | 3.2/1 | broad | 70 | 4.5 | poor | 180 | 600 | 75 |
| Example 6 | 91.9/8.1 | 45000 | 99000 | 2.2/1 | single | 79 | 8.5 | good | 250 | 690 | 90 |
| Example 7 | 88.3/11.7 | 36000 | 85000 | 2.4/1 | " | 62 | 3.0 | " | 160 | 730 | 83 |
| Comparative Example 2 | 90.5/9.5 | 45000 | 149000 | 3.3/1 | broad | 73 | 5.1 | poor | 170 | 670 | 87 |

COMPARATIVE EXAMPLE 3

Copolymerization was carried out in the same manner as in Example 1, except for changing the ethylene feed rate to 100 g/hr and the 1-butene feed rate to 500 g/hr. The copolymer produced was totally soluble in the hexane solvent, and the system became a viscous solution. The copolymer recovered was rubber-like and had a low strength at break as 140 kgf/cm$^2$.

COMPARATIVE EXAMPLE 4

Copolymerization was carried out in the same manner as in Example 1, except for changing the ethylene feed rate to 300 g/hr, the 1-butene feed rate to 300 g/hr, and the polymerization temperature to 25° C. As a result, the copolymerization system became a slurry in which most of the copolymer produced was suspending in the hexane solvent as insoluble fine particles, a part of the copolymer particles being found deposited onto the inner wall of the piping in the downstream side of the outlet of the vessel. The recovered copolymer had a low elongation at break as 420%.

EXAMPLE 8

Ethylene and 1-butene were continuously copolymerized by using the same polymerization vessel as used in Example 1 to which was connected a 10 l-volume SUS-made pressure-resistant stirring tank equipped with a stirring blade, a jacket, and an outlet for withdrawing gasified components at the top thereof (hereinafter referred to as degassing apparatus).

Hexane as a polymerization solvent was continuously fed to the lower part of the vessel at a feed rate of 5 l/hr, while the polymerization mixture was continuously withdrawn from the upper part of the vessel so as to maintain the volume of the polymerization mixture in the vessel at 5 l and introduced into the degassing apparatus. The polymerization mixture was further continuously withdrawn from the side of the degassing apparatus so as to control the volume of the polymerization mixture in the apparatus at 5 l. As a catalyst system, vanadium oxytrichloride, ethylaluminum sesquichloride, and ethyl dichlorophenylacetate were continuously fed to the lower part of the vessel at a rate of 0.020 mmol/hr, 0.55 mmol/hr, and 0.060 mmol/hr, respectively. Ethylene and 1-butene were continuously fed to the lower part of the vessel at a rate of 155 g/hr and 175 g/hr, respectively. Molecular weight control was effected with hydrogen. The copolymerization temperature was controlled at 55° C. by circulating cooling water through a jacket provided around the vessel.

The copolymerization reaction was carried out under the above-recited conditions to thereby produce an ethylene-1-butene copolymer in the form of a mixture of polymerization solvent-insoluble matter and polymerization solvent-soluble matter. The polymerization mixture was continuously withdrawn from the vessel and introduced into the degassing apparatus. A small amount of methanol was added to the polymerization mixture in the degassing apparatus to stop the reaction. The inner temperature of the apparatus was controlled at 40° C. while removing the unreacted monomers. The mixture withdrawn from the degassing apparatus assumed a slurry condition in which copolymer particles having a particle size of from about 0.01 to 0.1 mm were suspending in the hexane solvent.

The polymerization mixture sampled from the degassing apparatus was filtered through a metallic net of 300 mesh to separate the polymerization solvent-insoluble matter and polymerization solvent-soluble matter, and each of them was weighed to give an insoluble matter/- soluble matter weight ratio of 98/2. On the other hand, the polymerization mixture sampled from the polymerization vessel was found to have an insoluble matter/soluble matter weight ratio of 44/56.

While continuing the polymerization, warm water was then circulated through the jacket of the degassing apparatus to control the inner temperature at 70° C. The polymerization mixture withdrawn from the apparatus contained no solid particles and, instead, the copolymer produced was found to be in a dissolved state in the hexane solvent.

Polymerization was further continued, and the inner temperature of the degassing apparatus was cooled to 40° C. Then, the polymerization mixture returned to the slurry state comprising suspending copolymer particles.

The structural values of the copolymer sampled from the polymerization mixture kept at 70° C were consistent with those of the copolymer sampled from the mixture cooled to 40° C within measurement errors. The resulting copolymer was found to have an ethylene content of 94 mol% by infrared absorption analysis; an $\overline{M}w$ of 98,000, an $\overline{M}n$ of 49,000 by GPC analysis, giving a Q value of 2.0/1; a single fusion peak showing a Tm of 95° C and a ΔHm of 23 cal/g by DSC. Transparency and mechanical properties of the copolymer were evaluated in the same manner as in Example 1. The polymerization conditions used are shown in Table 3, and the results of analyses and evaluations are shown in Table 4.

EXAMPLES 9 AND 10 AND COMPARATIVE EXAMPLES 5 AND 6

Copolymerization was carried out in the same manner as in Example 8, except for changing the feed rates of the polymerization solvent, organoaluminum compound, halogenated ester compound, ethylene, and 1-butene or changing the kind or amount of the vanadium compound as shown in Table 3.

Each of the resulting copolymers was analyzed and evaluated in the same manner as in Example 1, and the results obtained ar shown in Table 4.

TABLE 3

| | | Feed Rate of Catalyst Component | | | Feed Rate of Monomer | |
|---|---|---|---|---|---|---|
| Example No. | Feed Rate of Solvent (l/hr) | Vanadium Compound*1 (mmol/hr) | Organo-aluminum Compound*2 (mmol/hr) | Halogenated Ester Compound (mmol/hr) | Ethylene (g/hr) | α-Olefin (g/hr) |
| Example 8 | 5.0 | 0.020 | 0.55 | 0.060*3 | 155 | 175 |
| Example 9 | " | 0.020 | 0.50 | 0.080*3 | 155 | 175 |
| Example 10 | " | 0.018 | 0.50 | 0.100*4 | 150 | 190 |
| Comparative Example 5 | 3.8 | 0.40 | 3.5 | — | 170 | 200 |
| Comparative Example 6 | 3.8 | 0.50*5 | 4.0 | — | 170 | 200 |

| | | | Solvent-Insoluble/Solvent-Soluble Polymer Weight Ratio | | |
|---|---|---|---|---|---|
| Example No. | Polymn. Temp. (°C.) | Output Rate of Copolymer (g/hr) | Polymerization Vessel | Degassing Apparatus at 40° C. | at 70° C. |
| Example 8 | 55 | 100 | 44/56 | 98/2 | 0/100 |
| Example 9 | 50 | 110 | 64/36 | 97/3 | 0/100 |
| Example 10 | 45 | 105 | 87/13 | 96/4 | 0/100 |
| Comparative Example 5 | 55 | 140 | 40/60 | 97/3 | 1/99 |
| Comparative Example 6 | 55 | 80 | 43/57 | 95/5 | 4/96 |

Note:
*1Vanadium oxytrichloride
*2Ethylaluminum sesquichloride
*3Ethyl dichlorophenylacetate
*4n-Butyl perchlorocrotonate
*5Tri(isopropoxy)oxyvanadium

TABLE 4

| Example No. | Ethylene/α-Olefin Molar Ratio in Copolymer | GPC | | | DSC | | | Trans-parency | Mechanical Properties | | |
|---|---|---|---|---|---|---|---|---|---|---|---|
| | | Mn | Mw | Q | Peak Shape | Tm (°C.) | ΔHm (cal/g) | | Strength at Break (kgf/cm²) | Elongation at Break (%) | Surface Hardness |
| Example 8 | 94.0/6.0 | 49000 | 98000 | 2.0/1 | single | 95 | 23 | good | 320 | 720 | 93 |
| Example 9 | 94.8/5.2 | 55000 | 110000 | " | " | 85 | 10 | " | 340 | 740 | 91 |
| Example 10 | 92.7/7.3 | 63000 | 132000 | 2.1/1 | " | 76 | 8.1 | " | 310 | 650 | 86 |
| Comparative Example 5 | 93.2/6.8 | 34000 | 106000 | 3.1/1 | broad | 77 | 14 | poor | 330 | 700 | 88 |
| Comparative Example 6 | 93.6/6.4 | 31000 | 138000 | 4.5/1 | broad, 2 peaks (small peak at 110° C.) | 78 / 110 | 6.3 / 2.2 | extremely poor | 300 | 610 | 83 |

REFERENCE EXAMPLES 1 TO 3

Each of the copolymers obtained in Examples 8, 9, and 10 was mixed with 0.1% by weight of calcium stearate, 0.2% by weight of octadecyl-3-(3',5'-di-t- butyl-4-hydroxyphenyl)propionate ("IRGANOX ® 1076" produced by Chiba-Geigy AG), and 0.05% by weight of trisnonylphenyl phosphite ("ANTIGENE ® TNP" produced by Sumitomo Chemical Co., Ltd.). The resulting compound was pelletized and molded into a film having a thickness of 30 μm. Physical properties of the film are shown in Table 5.

COMPARATIVE REFERENCE EXAMPLES 1 TO 3

Each of the copolymers obtained in Comparative Examples 5 and 6 and an LLDPE was compounded with additives and molded into a film in the same manner as in Reference Examples 1 to 3. Physical properties of each of the resulting films are shown in Table 5.

TABLE 5

|  | Reference Example No. | | | Comp. Ref. Ex. No. | | |
| --- | --- | --- | --- | --- | --- | --- |
|  | 1 | 2 | 3 | 1 | 2 | 3 |
| Copolymer | Ex. 8 | Ex. 9 | Ex. 10 | Comp. Ex. 5 | Comp. Ex. 6 | LLDPE *5 |
| Density*1 (g/cm³) | 0.9064 | 0.9081 | 0.9012 | 0.9018 | 0.9020 | 0.9120 |
| Haze*2 (%) | 2.8 | 3.2 | 2.2 | 6.9 | 25.3 | 10.4 |
| CXS*3 (%) | 1.6 | 1.5 | 2.1 | 3.6 | 5.7 | 10.3 |
| Heat-Sealable Temp.*4 (°C.) | 92 | 95 | 90 | 93 | 98 | 110 |

Note:
*1 Measured at 25° C.
*2 Measured according to ASTM D-1003
*3 A weight loss of a test specimen on immersion in xylene at 30° C. for 24 hours was determined.
*4 Two sheets of a sample film (width: 1.5 cm) were fused together under a pressure of 2 kg/cm² for a sealing time of 1 second by means of a heat sealer, and the sealed area was subjected to peel test. The minimum heat sealing temperature which provided such a sealing strength that the sealed area was divided into two layers through breaking without involving peeling at the sealed surface was taken as a heat-sealable temperature.
*5 A trial product of SUMIKATHENE ® L produced by Sumitomo Chemical Co., Ltd., having a melt flow index (MFI) of 1.9 at 190° C., which is confirmed to be an ethylene-1-butene copolymer by infrared absorption analysis.

As described above, the present invention provides an ethylene-α-olefin copolymer having a narrow molecular weight, a uniform composition, and a small solvent extractable content and thereby exhibiting excellent transparency and low-temperature heat-sealing properties. The process according to the present invention for producing such an ethylene-α-olefin copolymer, in which copolymerization is carried out in such a system that a hydrocarbon solvent-insoluble polymer and a hydrocarbon solvent-soluble polymer coexist, is advantageous from the standpoint of equipment, energy, and cost.

While the invention has been described in detail and with reference to specific embodiments thereof, it will be apparent to one skilled in the art that various changes and modifications can be made therein without departing from the spirit and scope thereof.

What is claimed is:

1. A process for producing an ethylene-α-olefin copolymer having an ethylene/α-olefin molar ratio of from 92/8 to 96/4 and having a number average molecular weight of from 35,000 to 80,000 and a weight average molecular weight/number average molecular weight ratio of from 1.8/1 to 2.6/1 as determined by gel permeation chromatography, and showing a single endothermic peak as determined by means of a differential scanning calorimeter, said endothermic peak being in the range of from 80° C. to 105° C., which comprises copolymerizing ethylene and an α-olefin having from 4 to 8 carbon atoms at an ethylene/α- olefin molar ratio of from 40/60 to 58/42 at a temperature of from 40 to 65° C. using a catalyst system composed of a vandaium compound represented by formula:

wherein R represents a hydrocarbon group; X represents a halogen atom; and n is a number of from 0 to 1, an organoaluminum compound represented by formula:

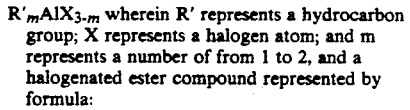

R'$_m$AlX$_{3-m}$ wherein R' represents a hydrocarbon group; X represents a halogen atom; and m represents a number of from 1 to 2, and a halogenated ester compound represented by formula:

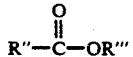

wherein R" represents an organic group derived from a hydrocarbon group having from 1 to 20 carbon atoms by substituting a part or all of the hydrogen atoms thereof with a halogen atom; and R''' represents a hydrocarbon group having from 1 to 20 carbon atoms, at an organoaluminum compound/vanadium compound molar ratio of from 2.5/1 to 30/1 and at a halogenated ester compound/vanadium compound molar ratio of 1.5/1 or more, in a system in which a polymer insoluble in a hydrocarbon solvent and a polymer soluble in a hydrocarbon solvent coexist, said hydrocarbon solvent-insoluble polymer is 95% by weight or more based n the total polymer at 40° C. and 100% by weight based on the total polymer at 70° C.

2. A process as claimed in claim 1, wherein n in the formula representing the vanadium compound is 0.

3. A process as claimed in claim 1, wherein m in the formula representing the organoaluminum compound is 1.5.

4. A process as claimed in claim 1, wherein said halogenated ester compound is a perchlorocrotonic acid ester.

5. A process as claimed in claim 1, wherein said α-olefin is 1-butene.

* * * * *